March 12, 1957  J. H. GRAHAME  2,785,314
RADIOACTIVITY EARTH EXPLORATION
Filed Sept. 28, 1951
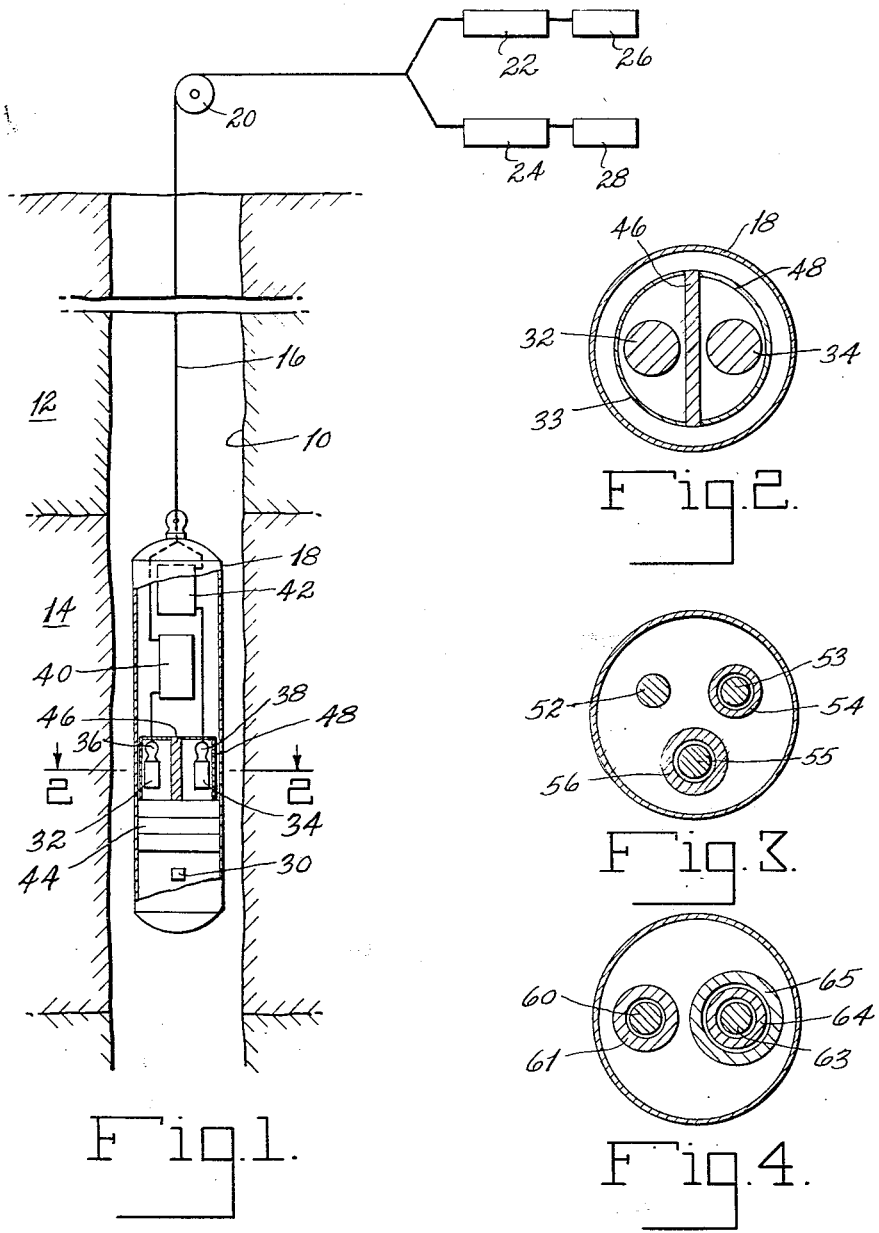
INVENTOR.
JAMES H. GRAHAME
BY
ATTORNEYS

United States Patent Office 2,785,314
Patented Mar. 12, 1957

2,785,314

RADIOACTIVITY EARTH EXPLORATION

James H. Grahame, Mount Vernon, N. Y., assignor to The Texas Company, New York, N. Y., a corporation of Delaware Application September 28, 1951, Serial No. 248,760

11 Claims. (Cl. 250—71)

This invention relates to the study of earth formations and more particularly to a method and an apparatus for logging the formations traversed by a well bore hole. The principal object of the invention is the provision of a method and means whereby two radioactivity logs can be made in a bore hole, these logs serving to identify or indicate different characteristics of the formations traversed by the hole and the two logs being made simultaneously at exactly the same depths in the hole. In other words, the measurements of either primary or secondary radiation from the formations are made in substantially the same horizontal plane as the logging instrument travels through the bore hole, or, in the case of surface surveying the measurements of radiation from the earth would be made in substantially the same vertical plane.

It is well-known that the characteristics of formations surrounding a bore hole can be ascertained by the measurement of penetrative radiation in several different manners. Thus, a gamma ray detector with the proper associated equipment passed through the bore hole will measure variations in the intensities of gamma rays emitted naturally in the different formations. A record of these variations in gamma ray intensity is usually referred to as a natural gamma ray log, and such a log provides information as to the nature of the formations, that is whether a formation comprises mainly a sand, a shale, a limestone, etc.

In another form of radioactivity bore hole logging a source of neutrons is passed through the bore hole, some of the neutrons being scattered in the surrounding formations and returning to a detector in the hole near the source. The measurement of the variations in the intensities of these neutrons as the source and detector are moved past different formations provides an indication of the hydrogen content and thus the porosities of the formations traversed. Such a log is usually termed a scattered neutron log. Depending upon the nature of the formations, the neutrons from the source in bombarding the formations cause a greater or lesser number of gamma rays to be induced therein and some of these induced gamma rays enter the bore hole. A measurement of the intensity of these induced gamma rays also provides an indication of characteristics such as the porosity of a formation. The record obtained with this method is usually called an induced gamma ray log.

The sources of neutrons which are generally used, such, for example, as a mixture of radium and beryllium also emit gamma rays due to the presence of the radium and these gamma rays penetrate and are scattered within the formations surrounding the hole, some of them returning to the hole. A measurement of the intensities of these scattered gamma rays usually termed a "scattered gamma ray log" also provides information as to certain characteristics, for example, the densities of the formations.

It is frequently desirable to make two or more of the above-mentioned logs at the same time, that is with one passage of the logging instrument through the bore hole, and it is usually necessary that the logging instrument contain a source of primary radiation such as neutrons or gamma rays, or both, and two or more detectors, one for each of the types of radiation which it is desired to measure. For example, a logging instrument may contain a source of neutrons and gamma rays, a detector for the induced gamma rays, another detector for the scattered gamma rays and a third detector separated at some distance from the source for measuring the gamma rays naturally emitted in the formations. If desired, a fourth detector can be included in the logging instrument housing for measuring scattered neutrons.

In the past, the detectors have been disposed in vertical alignment with the source and separated from the source by various distances. This has been due partly to the fact that the space within the logging instrument housing is limited, the housing frequently being about 3" in diameter. In order to provide sufficient sensitivity, the detectors are but slightly less in diameter than the inside of the housing. Thus, each detector substantially fills the space within the housing in a horizontal or lateral direction. The detectors, which are usually of the ionization chamber type or of the counter type in which electrical pulses are produced by the intercepted radiation, are of various lengths, a natural gamma ray detector frequently being as long as 40" while the detector for induced and scattered gamma rays and for scattered neutrons may be, for example, from 12" to 18" in length. It is seen, therefore, that the logging instrument, in order to house the source and two or more detectors, must be quite long. A particular disadvantage of the systems which have been used herein before lies in the fact that since the detectors are spaced at different distances vertically from the source, the radiation which they intercept reaches them from different parts of a formation or frequently from different formations altogether. Thus, the detector closest to the source will intercept scattered or induced radiation from the formation immediately opposite the source and detector while a detector which is spaced farther from the source may receive the radiation from a different formation altogether. This is due to the fact that the formations have definite boundaries or interfaces and during the passage of the instrument through the hole, one of these interfaces will at some time be between the source and the detector. It can be seen, therefore, that although two or more logs can be made simultaneously with the apparatus which has previously been used, the information obtained as the result of these logs will not always provide a true picture since the measuring instruments are not all in the same horizontal plane with respect to the source of primary radiation.

As is pointed out in the co-pending application of Gerhard Herzog, Serial No. 240,992, filed August 9, 1951, the fairly recently developed radiation detector known generally as the scintillometer is not only more sensitive and efficient for detecting penetrative radiation such as gamma rays and neutrons but it is also very small, as compared to a detector of the ionization chamber or counter type. As is now generally well-known, the scintillometer comprises a substance or luminophor such as a thallium activated sodium iodide crystal and a photo tube or photo multiplier. Gamma rays or neutrons penetrating the luminophor produce photons, and these scintillations strike the cathode of the photo tube in which they are amplified to produce electrical pulses corresponding in number to the gamma rays intercepted by the luminophor. These pulses are amplified and recorded in correlation to the depth of the measurements in the bore hole to produce a radioactivity log of the formations.

In accordance with the present invention, at least two scintillometers are disposed in a fairly short vertical zone and in the same horizontal plane in the vicinity of the source of radiation in the logging instrument housing. One of these scintillometers is shielded to absorb low energy radiation, while permitting the higher energy radiation to strike the luminophor, and the other scintillometer is unshielded so that it will respond to substantially all of the radiation of different energies. The energy of a scattered gamma ray is usually about .5 m. e. v. or less, the energy of a natural gamma ray about 1 m. e. v. or slightly higher while the energy of an "induced" gamma ray is usually about 2.2 m. e. v. As will be pointed out hereinafter, by proper shielding of one or both of the detectors, to absorb radiation of a predetermined energy or energies, several different combinations of logs may be made.

Where it is desired to make an induced gamma ray log and a natural gamma ray log simultaneously in accordance with the present invention, one of the scintillometers will be surrounded preferably by a layer of a material such as lead or tungsten thick enough to absorb the low energy of both scattered and natural gamma rays before they strike the luminophor. The response of this detector will, therefore, be a measure of the intensity of the higher energy or induced gamma rays. The other detector is surrounded with a thinner shield thick enough to absorb only the scattered gamma rays and will respond to both the induced and natural gamma rays. By subtracting the output of the thicker shielded detector from that of the thinner unshielded detector, the resulting measurement will be an indication of the intensity of the natural gamma rays. Thus, two different logs can be obtained simultaneously and at exactly the same horizontal position and distance from the source in the bore hole. This is all made possible, of course, by the fact that the scintillometer can be made so small as compared to ordinary detectors that two or even three of the scintillometers can be disposed horizontally opposite each other within the well-logging instrument housing.

It will be pointed out hereinafter that by proper shielding of one of the detectors, and/or using an additional scintillometer, other combinations of logs can be made, such, for example, as natural gamma ray and scattered gamma ray logs, natural gamma ray and scattered neutron logs, induced gamma ray and scattered neutron logs and also induced gamma ray and scattered gamma ray logs.

For a better understanding of the invention, reference may be had to the accompanying drawing in which:

Fig. 1 is a vertical elevation through a portion of a bore hole showing suspended therein a radioactivity logging instrument embodying this invention;

Fig. 2 is a cross section on the line 2—2 of Fig. 1.

Fig. 3 is a cross-sectional view showing a modification in which three different detectors are used within the instrument.

Fig. 4 is a cross-sectional view of an instrument provided with at least two detectors with a different type of shielding around one of them.

Referring to the drawing and particularly to Figures 1 and 2 thereof, a well bore hole 10 is shown as traversing subsurface formations such as those indicated at 12 and 14. The bore hole may or may not be provided with a casing since penetrative radiation such as neutrons and gamma rays will pass through the ordinary casing with very little loss. Shown within the bore hole and suspended from a conductor cable 16, which may be of the multiple conductor type, is a logging instrument indicated generally by the somewhat elongated closed housing 18. At the surface, the cable 16 passes over a suitable cable measuring reel 20 and to a pair of amplifiers 22 and 24 connected in turn to suitable recorders 26 and 28. The cable measuring device 20 is connected in any suitable manner such, for example, by a Selsyn motor system to the recorders 26 and 28 so that the records or logs made by these instruments can be correlated with the amount of cable payed out and thus the depth of the logging instrument 18 in the bore hole.

Within the housing 18 and preferably near the bottom thereof is a source 30 of primary penetrative radiation such as neutrons. A suitable source comprises a mixture of radium and beryllium and from such a source gamma rays will also be emitted due to the decay of the radium which is present. Neutrons from the source 30 pass outwardly to penetrate the formations and, depending upon the nature of the formation being bombarded, more or less gamma rays will be induced due to nuclear collision, some of these induced gamma rays passing into the bore hole. At the same time, gamma rays originating in the source 30 pass outwardly into the formations wherein, again depending upon the nature of the formation being bombarded, more or less of the gamma rays will be scattered, some of them passing back into the bore hole.

Enclosed within the instrument housing 18 and spaced vertically from the source 30 by a distance of a few inches or perhaps a foot or more are a pair of radiation detectors of the scintillometer type, these detectors being indicated by the reference characters 32 and 34 applied to the luminophors of the detectors. These detectors are illustrated somewhat diagrammatically and the luminophors are shown as being in contact with or close to photo tubes 36 and 38, respectively. The luminophors may be formed of thallium activated sodium iodide crystals, for example, and the photo tubes may be of the 5819 type manufactured by the Radio Corporation of America. The outputs of the photo tubes 36 and 38 pass to the preamplifiers 40 and 42, respectively, and the preamplified outputs pass upwardly through the cable 16 to the respective amplifiers 22 and 24 and from there to the recorders 26 and 28.

Disposed between the source 30 and the scintillometers is a shield 44 which may comprise a bottom layer of a hydrogenous substance such as paraffin, an intermediate layer of a substance for absorbing slow neutrons such as cadmium and an upper layer of gamma ray absorbing material such, for example, as lead or tungsten. Neutrons emitted from the source 30 which tend to pass upwardly directly to the detectors will be slowed down in the paraffin and absorbed in the layer of cadmium, while gamma rays from the source 30 passing upwardly toward the detectors will be absorbed in the layer of lead or tungsten, and direct radiation from the source will thereby be prevented from reaching the detectors. The detector or scintillometer 34 is shown as separated from the scintillometer 32 by a gamma ray absorbing shield 46 of lead or the like, and at the sides nearest the formation walls by a relatively thinner gamma ray absorbing layer 48 as is shown more clearly in Fig. 2. This layer 48 is thick enough to absorb both the scattered and natural gamma rays. In similar manner the scintillometer 32 is shielded with a still thinner shield 33 sufficient to absorb scattered gamma rays.

The scintillometers 32 and 34 are disposed in parallel or horizontally opposite each other, i. e., in substantially the same horizontal plane or zone and it will be observed that the zone for measuring radiation from the formations has a vertical dimension substantially equal only to the height of the luminophors of the detectors.

With the apparatus which has been described, neutrons and gamma rays will pass from the source 30 into the formations from which induced gamma rays and scattered gamma rays will pass back into the hole, some of these passing toward the detectors. The induced gamma rays and natural gamma rays striking or penetrating the luminophor 32 will cause photon emission therein and electrical pulses will be produced in the photo tube or photo multiplier tube 36. These pulses will be preamplified at 40 and passed upwardly over the cable 16 to the amplifier 22 from which they will be recorded at 26 preferably in the form of a log on a moving strip or tape.

Since the induced gamma rays have an energy of around 2.2 m. e. v. which is considerably higher than the energy of both natural and scattered gamma rays, most of the induced gamma rays will pass through the shield 48 and will strike or penetrate the luminophor 34. Assuming that the thickness of the lead shield 48 is approximately ¼" to ⅜", most of the natural gamma rays having an energy of about 1.0 m. e. v. and the scattered gamma rays which have an energy of .5 m. e. v. or less will be absorbed in the shield and, therefore, will not strike the luminophor 34. The electrical pulses from the photo tube 38 are amplified at 42 and passed upwardly over the cable 16 to the amplifier 24 from which they are recorded in log form at 28. The log provided by the recorder 28 will, therefore, be an induced gamma ray log of the formations traversed by the instrument 18 and will provide information as to the porosities of these formations. Since the output of the scintillometer 32 will correspond to a mixture of induced gamma rays and natural gamma rays, it is preferred that the amplifiers include any suitable well-known subtractive circuit whereby the output from the preamplifier 42 can be subtracted from the output of the preamplifier 40, the remaining output which is passed to the recorder 26 corresponding to the natural gamma rays which have caused photon emission in the luminophor 32. The record from the device 26 will, therefore, comprise a natural gamma ray log which will indicate the nature of the formations traversed by the logging instrument 18.

Since the luminophors 32 and 34 are disposed in the same horizontal plane or zone, the resulting logs will indicate the characteristics of exactly the same formations or portions of a formation. As has been explained hereinbefore, if the detectors were spaced vertically at different distances from the source 30, the simultaneous response of the detectors would not be indicative of exactly the same formation structure and the secondary radiation reaching the detector farthest from the source might even travel through an entirely different formation from that traversed by the secondary radiation reaching the detector closer to the source. The fact that the two logs as made simultaneously with the apparatus which has been described are indicative of the same formations is a very important one and permits the log records to be compared directly without the necessity for any shifting of one respect to the other due to different vertical distances between detectors. Another very important advantage of the described arrangement is pointed out in the aforementioned Herzog application, Serial No. 240,992. This resides in the very good definition which it is possible to obtain and is due to the fact that the luminophors 32 and 34 are very small, as compared to detectors of the ionization chamber or counter type. Thus, the vertical dimensions of the luminophors 32 may be as little as one or two inches as compared to lengths of conventional type detectors which run from 12 inches to as much as 40 inches.

As is pointed out in the aforementioned Herzog application, Serial No. 240,992, it may be desirable to maintain the scintillometers at a predetermined temperature lower than that encountered in the bore hole. It is contemplated that any suitable cooling arrangements may be used such, for instance, as a Dewar flask containing cracked ice or Dry Ice and in which the scintillometer may be immersed.

While the invention has been described so far as having application in the making of two simultaneous well logs, one being an induced gamma ray log and another a natural gamma ray log, it is contemplated that through the use of proper shielding, and/or with inclusion of an additional scintillometer, other combinations of logs can also be made simultaneously and these logs will have the same advantages of sharp definition and of having been made in exactly the same formations, as has been described with reference to the combination of induced gamma ray and scattered gamma ray logs.

As an example of one modification, it may be desired to make simultaneously a natural gamma ray log and a scattered gamma ray log. In this case, the source 30 will comprise a source of gamma rays only such as a small amount of radium and the two lower layers of the direct shield 44 can be dispensed with. Since natural gamma rays may be considered as having an average energy of around 1 m. e. v. as compared to an energy of .5 m. e. v. or less, for scattered gamma rays, the shield 48 can comprise a thinner layer of lead or the like. For example, a ⅛" layer of lead will absorb most of the scattered gamma rays while permitting most of the higher energy natural gamma rays to strike the luminophor 34. Also in this instance the shield 33 is dispensed with. In this case, the output of the shielded detector 34 will provide the natural gamma ray log of the traversed formations and this can be subtracted as has been described above from the output of the detector 32 so that the remaining output of the detector 32 will provide a scattered gamma ray log.

A combination induced gamma, scattered gamma and natural gamma ray log can be made by employing three scintillometer detectors as indicated in Fig. 3 in which case the housing 18 would contain a third preamplifier and the surface equipment would include a third amplifier connected in turn to a suitable recorder. The source 30 may be the source as described in connection with Fig. 1 and shielded in similar manner from the scintillometers to prevent direct radiation from the source.

As indicated in Fig. 3, detector 52 is unshielded and is acted upon by scattered, natural, and induced gamma radiation. Thus, the output therefrom provides a log of the total energy due to these three types of radiation. The detector 53 is provided with a circular and closed shield 54, for example, of ⅛ inch thick lead, and sufficient to absorb scattered gamma radiation. The third detector 55 is surrounded with a thicker and circular closed shield 56, for example, about ¼ inch thick lead, and sufficient to absorb both scattered and natural gamma radiation. The output from detector 55 provides the induced gamma ray log of the traversed formations. This can be subtracted from the output of detector 53 to provide a natural gamma log. The output of detector 53 can be subtracted from the output of detector 52 to provide the scattered gamma log. In this modification the three detectors 52, 53, and 55 may also respond to scattered neutrons but since the neutron response should be substantially the same for each detector, it can be disregarded.

A still further modification permits bombarding the formations with a gamma-free neutron source such as polonium-beryllium and obtaining a combination scattered neutron log plus either an induced gamma log or an induced and natural gamma log. For this case, two detectors may be used as indicated in Fig. 4.

When using a gamma-free neutron source the radiation passing back from the formations will comprise scattered neutrons, induced gamma rays and natural gamma rays. Detector 60 is surrounded with a circular and closed lead shield 61 about ½ inch thick or such that induced and natural gamma rays are absorbed and the output from the detector can thus be recorded as a scattered neutron log. The detector 63 is surrounded by two concentric closed shields 64 and 65, respectively. The inner shield 64 comprises lead, for example, while the outer shield 65 comprises a layer of cadmium capable of reacting with scattered neutrons. If the lead shield 64 is not more than about ⅛ inch thick, it will absorb gamma rays produced by nuclear reaction within the cadmium layer, so that the output from the detector 63 will be a log of induced plus natural gamma rays striking the scintillometer. If the thickness of the lead shield 64 is increased, say to ¼ inch, or sufficient to absorb the natural but not the induced gamma rays, then the output from detector 63 will be a log of the induced gamma radiation.

If desired, a third detector similar to 63 can be provided but with a lead shield sufficiently thick to absorb only the natural gamma rays so that its output is a log of the induced gamma radiation while the output from the detector 63 operating with a thinner lead shield provides a measure of the combined induced and natural gamma radiation. By subtracting the output of this third detector from the output of detector 63 a natural gamma log is obtained simultaneously with the scattered neutron log of the formations.

If desired, additional shielding may be provided between the individual detectors of Fig. 4, particularly when the aforementioned third detector is included. For example, a lead partition or partitions may be provided to absorb any induced gamma rays emitted from the exterior or peripheral surfaces of the cadmium shields and which might otherwise strike this third detector.

Although mention has been made of thallium activated sodium iodide crystals as a luminophor material, it is contemplated that other substances may be used such as zinc sulfide, zinc silicate, etc. The phosphor material is advantageously of solid form and may comprise a phosphor material incorporated in a matrix such as described in U. S. Patent 2,559,219 granted to Clifford G. Ludeman, July 3, 1951, for Detection and Measurement of Penetrative Radiation.

While the invention has been described in connection with the logging of well bore holes, it is believed apparent that occasions may arise when it is desired to make simultaneously two different logs or surveys of formations appearing at or near the surface of the earth. In such a case, the instrument 18 can be turned on its side and pulled along the surface of the earth either in contact therewith or held above the surface, and it is contemplated that the invention which has been described will have application wherever it is desired to make two or more simultaneous records of characteristics of earth formations, which may be disposed side by side along the earth's surface or one above another, as is the case where the earth is traversed by a well bore hole.

Obviously many modifications and variations of the invention as hereinbefore set forth, may be made without departing from the spirit and scope thereof and, therefore, only such limitations should be imposed as are indicated in the appended claims.

I claim:

1. The method of logging earth formations which comprises bombarding said formations with a source of penetrative radiation traversing said formations, said radiation having at least one average energy whereby secondary gamma radiation having at least one average energy returns to the vicinity of the source together with primary gamma radiation naturally emitted from the formation and having another and different average energy, measuring in a zone in the vicinity of said source a mixture of radiation of both energies reaching said zone, simultaneously therewith measuring in said measuring zone in the same plane normal to the direction of the traversing source radiation of the higher energy reaching said zone, recording the measurement of the intensity of the radiation of higher energy reaching said zone to provide a log of the formations, subtracting the measurement of the said radiation of higher energy from the measurement of the said mixture of radiation of both energies to provide a measurement of the radiation of lower energy reaching said zone and recording the last-named measurement to provide another log of the formations traversed by the bore hole.

2. The method of logging formations traversed by a well bore hole which comprises bombarding said formations with penetrative radiation from a source passed through the hole, said radiation having at least one average energy whereby secondary gamma radiation having at least one average energy returns to the hole together with primary gamma radiation naturally emitted from the formations and having another and different average energy, measuring in a zone in the vicinity of said source a mixture of radiation of both energies reaching said zone, simultaneously therewith measuring in said measuring zone and in the same horizontal plane radiation of the higher energy reaching said zone, recording the measurement of the intensity of the radiation of higher energy reaching said zone to provide a log of the formations, subtracting the measurement of the intensity of the said radiation of higher energy from the measurement of the said mixture of radiation of both energies to provide a measurement of the radiation of lower energy reaching said zone and recording the last-named measurement to provide another log of the formations traversed by the bore hole.

3. The method as described in claim 1 in which the measuring of the secondary radiation is accomplished by exposing to the mixture of secondary radiation of both energies reaching the measuring zone a substance in which photons are produced when the substance is penetrated by said radiation, producing electrical pulses corresponding to said photons, simultaneously exposing to the secondary radiation of said one average energy reaching said zone a substance in which photons are produced when it is penetrated by the radiation of said one energy, producing electrical pulses corresponding to the last-mentioned photons, separately measuring the electrical pulse rates corresponding to the mixture of secondary radiation and to the secondary radiation of said one energy alone, recording the measurement of the secondary radiation of said one energy to provide a log of the formations, and subtracting the latter measurement from the former measurement and recording the result to provide a log of the secondary radiation of the other energy.

4. The method of logging formations transversed by a well bore hole which comprises bombarding said formations with neutrons and gamma rays from a source passed through the hole whereby gamma rays are induced in the formations by the neutron bombardment and whereby gamma rays originating in the source are scattered in the formations, some of the induced and scattered gamma rays returning to a measuring zone in the hole in the vicinity of said source, exposing to the mixture of induced and scattered gamma rays reaching said zone a substance in which photons are produced when the substance is penetrated by said gamma rays, producing electrical pulses corresponding to said photons, simultaneously exposing only to the induced gamma rays reaching said zone a substance in which photons are produced by gamma ray penetration, producing electrical pulses corresponding to said last-mentioned photons, and separately measuring the electrical pulse rate corresponding to the mixture of induced and scattered gamma rays and to the induced gamma rays alone, in correlation to the depth of the measuring zone in the hole.

5. The method of logging formations traversed by a well bore hole which comprises passing a source of neutrons and gamma rays through the hole to bombard said formations wherein gamma rays are induced by the neutron bombardment and wherein gamma rays originating in the source are scattered, some of the induced and scattered gamma rays returning to a zone in the hole spaced a constant distance vertically from said source, exposing to the mixture of gamma rays reaching said zone from the surrounding formations a substance in which photons are produced when the substance is penetrated by said gamma rays, producing electrical pulses corresponding to said photons, simultaneously exposing to the induced gamma rays reaching said zone a substance in which photons are produced by gamma ray penetration, producing electrical pulses corresponding to said last-mentioned photons, separately measuring the electrical pulse rate corresponding to the mixture of induced and scattered gamma rays and to the induced gamma rays alone, recording the measurement of the induced gamma rays to provide an induced gamma ray log, and subtracting the latter measurement from the former measurement to provide a log of the scattered gamma rays reaching said zone.

6. The method of logging formations traversed by a well bore hole which comprises bombarding said formations with neutrons from a source passed through the hole whereby neutrons are scattered in the formations and returned to the hole and gamma rays are induced in the formations and returned to the hole, some of the gamma rays naturally emitted in the formation also entering the hole, simultaneously and separately measuring in a measuring zone in the hole in the vicinity of said source, and in substantially the same horizontal plane the intensity of the mixture of both induced and natural gamma rays reaching said zone, the intensity of the induced gamma rays only reaching said zone and the intensity of the scattered neutrons only reaching said zone, recording the measurement of the scattered neutrons to provide a scattered neutron log, subtracting the measurement of induced gamma rays from the measurement of the mixture of natural and induced gamma rays to provide a measurement of the natural gamma rays reaching said zone and recording the last-named measurement to provide a natural gamma ray log of the hole.

7. An assembly for making a radioactivity log of a well bore hole traversing subsurface formations which comprises an instrument housing adapted to be passed through the whole while suspended from a conductor cable, a source of neutrons and gamma rays within said housing and adapted and arranged to irradiate said formation with both neutrons and gamma rays, a scintillometer disposed within said housing for producing electrical pulses when struck by gamma rays induced in said formations by the neutron bombardment thereof and by gamma rays originating in the source and scattered within said formations, a second scintillometer disposed within said housing and substantially horizontally adjacent to the first scintillometer, a shield around at least the sides of said second scintillometer for absorbing the gamma rays scattered in the surrounding formations, whereby said second scintillometer is responsive only to said induced gamma rays, a shield between said source and said scintillometers for preventing gamma rays and neutrons from the source from passing directly to the scintillometers and means for separately and simultaneously recording the responses of said scintillometers.

8. An assembly for making a radioactivity log of a well bore hole traversing subsurface formations which comprises an instrument housing adapted to be passed through the hole while suspended from a conductor cable, a source of neutrons and gamma rays within said housing and adapted and arranged to irradiate said formation with both neutrons and gamma rays, a pair of radiation detectors of the scintillometer type disposed within said housing at one vertical side of said source, said scintillometers being in substantially the same horizontal plane, a direct radiation shield between said source and said detectors, a shield around the sides of one of said detectors to absorb gamm rays from said source scattered in the formations, means for recording the output of the shielded detector to provide an induced gamma ray log, means for subtracting the output of the shielded detector from the output of the unshielded detector to provide a measurement of the scattered gamma rays reaching the unshielded detector, and means for recording said last-named measurement to provide a scattered gamma ray log of the hole.

9. An apparatus as described in claim 8 in which the source is a source of gamma rays only, the shielded detector responding to gamma rays naturally emitted in the formations and the unshielded detector to both the natural gamma rays and the gamma rays from the source scattered in the surrounding formations, whereby the resulting logs are logs of the natural gamma rays and of the gamma rays scattered in the formations surrounding the bore hole.

10. The method of logging formations traversed by a well bore hole which comprises bombarding said formations with gamma rays from a source passed through the hole whereby gamma rays originating in the source are scattered in the formations, some of the scattered gamma rays returning to a measuring zone in the hole in the vicinity of said source together with gamma rays naturally emitted from the formations, separately measuring within said zone and in substantially the same horizontal plane the intensity of the mixture of natural and scattered gamma rays and the intensity of the natural gamma rays reaching said zone, recording the measurement of natural gamma rays to provide a natural gamma ray log, subtracting the measurement of natural gamma rays from the measurement of the mixture of natural and scattered gamma rays to provide a measurement of the scattered gamma rays reaching said zone and recording the last-named measurement to provide a scattered gamma ray log of the hole.

11. An assembly for making a radioactivity log of a well bore hole traversing subsurface formations which comprises an instrument housing adapted to be passed through the hole while suspended from a conductor cable, a source of neutrons and gamma rays within said housing, a scintillometer disposed within said housing for producing electrical pulses when struck by gamma rays induced in said formations by the neutron bombardment thereof and by gamma rays originating in the source and scattered within said formations, a second scintillometer disposed within said housing and substantially horizontally adjacent to the first scintillometer, a shield around at least the sides of said second scintillometer for absorbing the gamma rays scattered in the surrounding formations, whereby said second scintillometer is responsive to said induced gamma rays, a shield between said source and said scintillometers for preventing gamma rays and neutrons from the source from passing directly to the scintillometers, means for recording the output of the second scintillometer to provide an induced gamma ray log together with means for subtracting the output of the second scintillometer from the output of the first scintillometer to provide a measurement of the scattered gamma rays, and means for recording the last-named measurement to provide a scattered gamma ray log of the formations surrounding the borehole.

References Cited in the file of this patent

UNITED STATES PATENTS

| | | |
|---|---|---|
| 2,351,028 | Fearon | June 13, 1944 |
| 2,445,305 | Hochgesang | July 13, 1948 |
| 2,508,772 | Pontecorvo | May 23, 1950 |
| 2,543,676 | Thayer et al. | Feb. 27, 1951 |
| 2,648,780 | Herzog | Aug. 11, 1953 |
| 2,711,482 | Goodman | June 21, 1955 |